J. J. HOWELL & O. H. WIENGES.
Detachable Handle for Hoes, Rakes, &c.
No. 220,618. Patented Oct. 14, 1879.
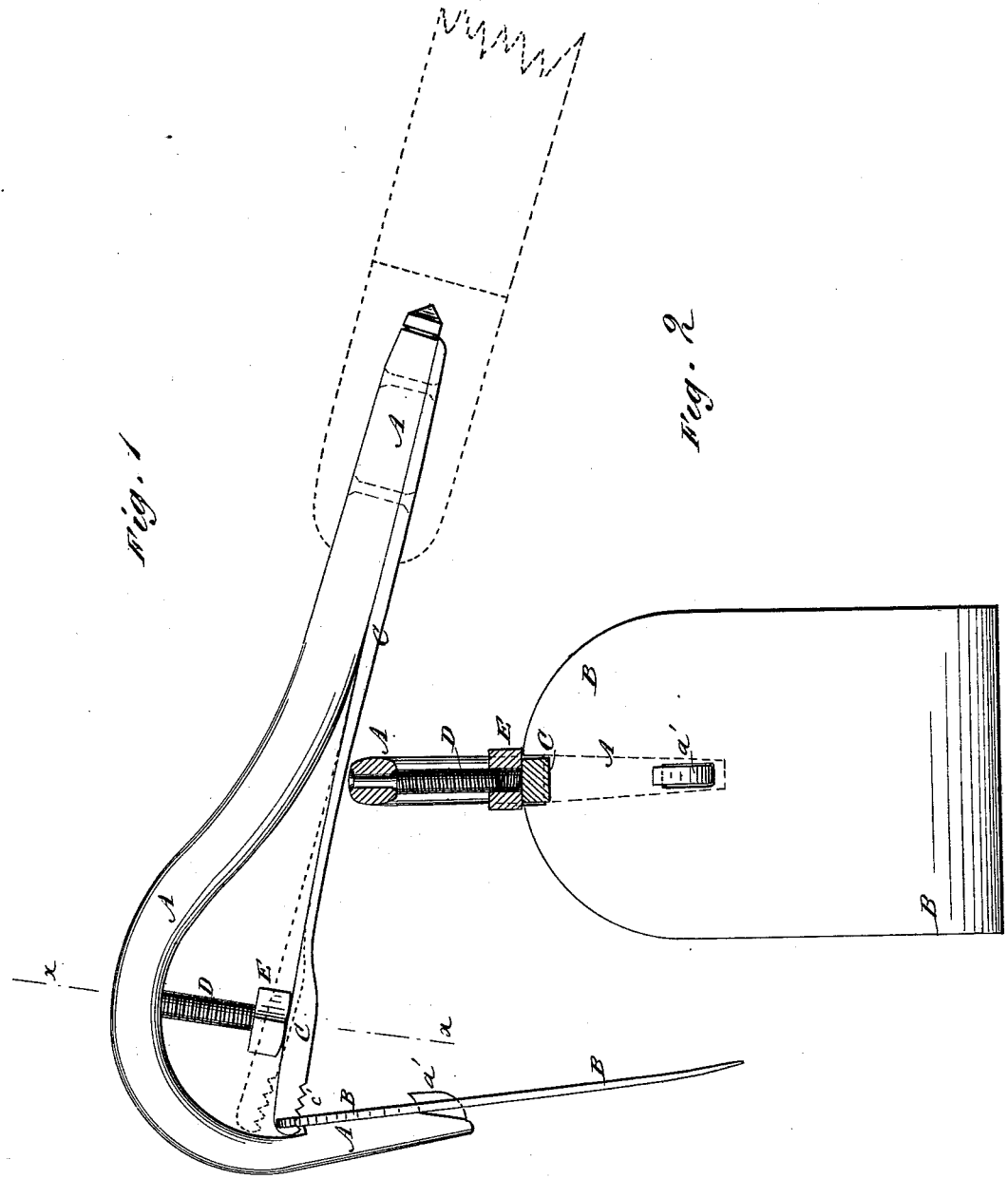
WITNESSES:
INVENTOR:
BY
ATTORNEYS.

UNITED STATES PATENT OFFICE.

JOHN J. HOWELL AND OSNEL H. WIENGES, OF FORT MOTTE, S. C.

IMPROVEMENT IN DETACHABLE HANDLES FOR HOES, RAKES, &c.

Specification forming part of Letters Patent No. 220,618, dated October 14, 1879; application filed June 28, 1879.

*To all whom it may concern:*

Be it known that we, JOHN JOSEPH HOWELL and OSNEL HYDRICK WIENGES, of Fort Motte, in the county of Orangeburg and State of South Carolina, have invented a new and useful Improvement in Detachable Handles for Hoes, Rakes, &c., of which the following is a specification.

Figure 1 is a side view of our improved handle, shown as applied to a hoe-plate. Fig. 2 is a cross-section of the same, taken through the line $x\ x$, Fig. 1.

Similar letters of reference indicate corresponding parts.

The object of this invention is to furnish an improved handle which shall be so constructed that it may be applied to hoes, rakes, and other similar garden and farm implements, and which may be easily and quickly detached from one implement and attached to another, and when attached will hold the implement firmly and securely.

The invention consists in the combination of the bent shank provided with the catch upon its lower end, the spring provided with the notches in its lower side, the screw, and the nut with each other, to adapt the device to receive and hold detachably a hoe or other implement, as hereinafter fully described.

A represents the shank, the upper end of which is designed to be inserted in the end of a handle and secured in place by rivets, keys, or other suitable means. The shank A is bent upward, forward, and downward to bring its lower end into proper position to receive the hoe B or other implement.

Upon the inner side of the lower end of the shank A is formed a projection or catch, $a'$, to pass through a short slot in the hoe B or other implement, and which is notched at its upper end to prevent the implement from slipping off it.

To the under side of the upper part of the shank A is attached the upper end of the spring C, the lower end of which extends to, or nearly to, the lower part of the said shank A.

In the lower side of the lower end of the spring C are formed four (more or less) notches, $c'$, to receive the upper edge of the hoe B or other implement.

The lower end of the spring C rests in a notch in the upper edge of the hoe B or other implement.

To the bend of the shank A is attached the upper end of a screw, D, which projects down nearly to the spring C, enough space being left to allow the said spring C to be pressed up so far that the hoe or other implement may be readily detached from the catch $a'$.

Upon the screw D is placed a nut, E, which may be turned down against the upper side of the spring C to lock the said spring in place upon the implement B, and may be turned up to allow the said spring to be raised and the implement detached.

The nut E must be made so long as to give it a firm bearing upon the screw D when turned down against the spring C.

With this construction, by moving the upper edge of the implement B from one to another of the notches in the spring C any desired pitch may be given to the said implement.

Having thus fully described our invention, we claim as new and desire to secure by Letters Patent—

The combination of the bent shank A, provided with the catch $a'$ upon its lower end, the spring C, provided with the notches $c'$ in its lower side, the screw D, and the nut E, with each other, to adapt the device to receive and hold detachably a hoe, B, or other implement, substantially as herein shown and described.

JOHN JOSEPH HOWELL.
OSNEL HYDRICK WIENGES.

Witnesses:
HENRY S. DARBY,
B. WALLING.